(12) United States Patent
Williams

(10) Patent No.: US 8,446,037 B2
(45) Date of Patent: May 21, 2013

(54) ENERGY STORAGE SYSTEM FOR PEAK-SHAVING OF DRILLING RIG POWER USAGE

(76) Inventor: Kevin R. Williams, Cypress, TX (US)

( * ) Notice: Subject to any disclaimer, the term of this patent is extended or adjusted under 35 U.S.C. 154(b) by 262 days.

(21) Appl. No.: 12/757,234

(22) Filed: Apr. 9, 2010

(65) Prior Publication Data

US 2011/0148209 A1    Jun. 23, 2011

Related U.S. Application Data

(60) Provisional application No. 61/266,734, filed on Dec. 4, 2009.

(51) Int. Cl.
*H02J 7/34* (2006.01)
*H02J 1/00* (2006.01)
*H02M 7/00* (2006.01)

(52) U.S. Cl.
USPC ............ 307/23; 307/18; 307/25; 363/13; 363/74

(58) Field of Classification Search
None
See application file for complete search history.

(56) References Cited

U.S. PATENT DOCUMENTS

| | | | |
|---|---|---|---|
| 7,408,272 B2 * | 8/2008 | Marquet | 307/48 |
| 2009/0195074 A1 * | 8/2009 | Buiel | 307/48 |
| 2009/0243390 A1 * | 10/2009 | Oto | 307/43 |

* cited by examiner

*Primary Examiner* — Hal Kaplan
(74) *Attorney, Agent, or Firm* — Egbert Law Offices, PLLC

(57) ABSTRACT

An energy storage means for a drilling rig has a source of power, an AC bus connected to the source of power, a DC bus, a load connected to the DC bus, a rectifier connected to the AC bus and to the DC bus for converting AC power from the source of power to DC power to the load, and an energy storage system connected to the DC bus. The energy storage system can be batteries, capacitors or combinations thereof. A diode is connected between the energy storage means and the DC bus so as to supply power to the load when the DC voltage is less than a DC source voltage. The energy storage system has a nominal voltage slightly lower than a voltage of a AC-to-DC conversion by the rectifier.

8 Claims, 4 Drawing Sheets

ENERGY STORAGE SYSTEM FOR PEAK-SHAVING OF DRILLING RIG POWER USAGE

RELATED U.S. APPLICATIONS

The present application claims priority from U.S. Provisional Patent Application Ser. No. 61/266,734, filed on Dec. 4, 2009 and entitled "Energy Storage System for Peak-Shaving of Drilling Rig Power Usage".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to energy systems as used on drilling rigs. More particularly, the present invention relates to systems for the peak-shaving of the power requirements for drilling rigs. Additionally, and furthermore, the present invention relates to peak-shaving systems as used so as to supply access power during tripping out loads.

2. Description of Related Art Including Information Disclosed Under 37 CFR 1.97 and 37 CFR 1.98

In the field of oil well drilling, significant amount of power is required during the drilling activity. The power requirements as used on a drilling rig serve to supply the drawworks, the mud pumps, the top drives, the rotary tables, the dynamic braking systems and other peripheral loads. In oil well drilling activities, oversized power systems are often utilized so as to meet the "peak" power requirements.

Historically, the number of engines/generators that are used and are typically "online" are more than the required load of the application due to the redundancy and necessary peak KW and VAR demand during certain aspects of the operation. In particular, these peak demands are during the "tripping" of the pipe or drill stem.

During normal operations, there is a base load of lighting, pumps, agitators, mixers, air compressors, etc. This base load can make up typical loads of 400-600 kilowatts. The mud pumps, top drives and rotary tables contribute another fairly consistent KW demand. This demand will vary based on the particular well, depth of drilling, and material being drilled.

During oil well drilling activities, the most intermittent load is the drawworks. This intermittent load is directed toward the peak demand during the raising or lowering of the drill pipe upwardly and downwardly in the well. This peak demand can have loads as much as 2-3 times the base loads of the other demands on the drilling rig.

When drilling and at times when the downhole tool has to be inspected or changed, it is required to pull all of the drill pipe from the hole. This distance can be 10,000 feet or more. The drill pipe must be taken apart and stacked as it is being removed. After repair or replacement, the reverse procedure must take place so as to reinsert all the components back to the desired depth. During the tripping in or out of the hole, the driller (operator) demands extreme power consumption and very quick bursts as the driller raises (or lowers) the string of drill pipe. Since there is a limitation on the height of the drilling mast, the operator must lift the sections in increments and unscrew the different sections. These sections are stacked one at a time. This process is repeated during the reinsertion of the drill pipe back into the hole. This process is referred to as "making a trip". The intermittent high demand occurs when this load (300,000 pounds or more) occurs over and over again. The load is inconsistent since the weight of the drill stem becomes less and less as sections are removed. The base load requirements for the drilling rig are approximately 600-800 KW. The peak demand can be 1.5 MW and as high as 2.0 MM. Because of these power requirements, the emissions of the engines/generators for a typical land rig are quite high. Newer engines can have much lower MOX output than earlier engines. There are also large amounts of carbon dioxide emissions. The fuel consumption during these intermittent demands can be quite significant.

FIG. 1 illustrates a schematic of the typical drilling rig topology utilizing a common DC bus system. As can be seen in FIG. 1, the AC synchronous engines/generators 10, 12 and 14 are synchronized to an AC bus 16. The AC bus 16 is synchronized onto a common AC fixed frequency/fixed voltage system from which peripheral loads, such as hotel loads, are supplied. The engine/generator 10 is connected to a voltage regulator 18 and to a governor 20. A potential transformer 22 is positioned between the voltage regulator 18 and the engine/generator 10. A cross current line 22 will extend from voltage regulator 18 to the engine/generator 12. A load sharing line 24 is connected to the governor of the various engine/generators. A circuit breaker 26 is positioned between the engine/generator 10 and the common AC bus 16.

The engine/generator 12 and the engine/generator 14 also include respective voltage regulators 28 and 30 and governors 32 and 34. Engine/generators 12 and 14 also have respective circuit breakers 36 and 38. Lines 40, 42 and 44 connect the engine/generators 10, 12 and 14 to the AC bus 16.

Motor control centers 46 and 48 have power transformers 50 and 52 respectively connected along lines 54 and 56 to the AC bus 16. Rectifiers 58 and 60 are placed respective lines 62 and 64 so as to convert the AC power along bus 16 into DC power. Lines 62 and 64 are, in turn, connected to the common DC bus 66.

The common DC bus feeds multiple (or current) source invertors for each of the rig functions. Line 68 is connected to a drawworks motor 70. Line 72 is connected to another drawworks motor 74. Line 76 is connected to a first mud pump motor 78. Line 80 is connected to a second mud pump motor 82. Line 84 is connected to a top drive 86. Line 88 is connected to the rotary table 90. Another line 92 is serves to connect the DC bus to a dynamic braking system 94. Each of the lines 68, 72, 76, 80, 84, 88 and 92 have a respective DC-to-AC variable frequency/variable voltage converters 96, 98, 100, 102, 104, 106, and 108. Each of the lines 68, 72, 76, 80, 84, 88 and 92 also has respective switches 110, 112, 114, 116, 118, 120 and 122 connected thereto. The switches are DC disconnect switches.

As can be seen in FIG. 1, the power requirements of the various motors 70, 74, 78, 82, 86, 90, and 94 must be supplied by the engine/generators 10, 12 and 14. In view of the "peak" requirements of the drawworks motors 70 and 74, the engine/generators 10, 12 and 14 will need to be oversized so as to meet the power requirements. In other circumstances, additional engine/generators must be connected to the AC bus 16 in order to supply the requisite power to the various motors associated with the drilling rig.

It is an object of the present invention to provide an energy storage system which reduces the number of diesel engine/generators required for the power requirements of the drilling rig.

It is an object of the present invention to provide an energy storage system that reduces fuel consumption by the engines/generators of the drilling rig.

It is a further object of the present invention to provide an energy storage system that reduces carbon dioxide and other emissions.

It is still a further object of the present invention to provide an energy storage system which minimizes the requirement for battery replacement.

It is a further object of the present invention to provide an energy storage system that utilizes rechargeable energy storage in order to supplement the power produced from the diesel engine/generators.

It is still a further object of the present invention to provide an energy storage system which creates a redundancy of the DC stored energy that is tied to the DC link with a passive device so as to improve the safety of the system.

These and other objects and advantages of the present invention will become apparent from a reading of the attached specification and appended claims.

BRIEF SUMMARY OF THE INVENTION

The present invention is an energy system for a drilling rig. This energy system includes a energy storage means, a source of power, at least one load, a common DC bus connected to the energy storage means and to the load, and a diode means connected to the energy storage means and to the common DC bus. The source of power is connected to the DC bus by a rectifying means. The rectifying means serves to convert AC power to DC power. The nominal voltage from the energy storage means is slightly lower than the rectified AC-to-DC conversion. Once the DC voltage is less than the DC source voltage, then the energy storage means supplies power to the load.

In the present invention, the energy storage means can be either batteries, capacitors or paralleled-series connections of batteries and capacitors. The energy storage means is a supply of DC power.

The source of power of the present invention includes at least one engine/generator. The engine/generator is an AC synchronous engine/generator. The load can be the drawworks, the mud pump, the top drive, the rotary table and dynamic braking.

In the present invention, the rectifying means is a SCR phase-controlled bridge rectifier. In another embodiment of the present invention, the rectifying means can further include an autotransformer connected to the SCR phase-controlled bridge rectifier so as to produce a twelve pulse converter. The current feedback from the source of power conducts back the AC-to-DC voltage once a threshold of current is reached. The autotransformer may not be necessary by using pulse converters that are phase-controlled, line-commutated SCR controllers. The nominal voltage is phased-controlled to be 10% above the energy storage means.

In the present invention, the energy storage means can be connected to a charger. The charger, in turn, can be connected to the DC bus. The charge will serve to restore the energy storage means to its desired requirements.

DETAILED DESCRIPTION OF THE INVENTION

Figure 1:
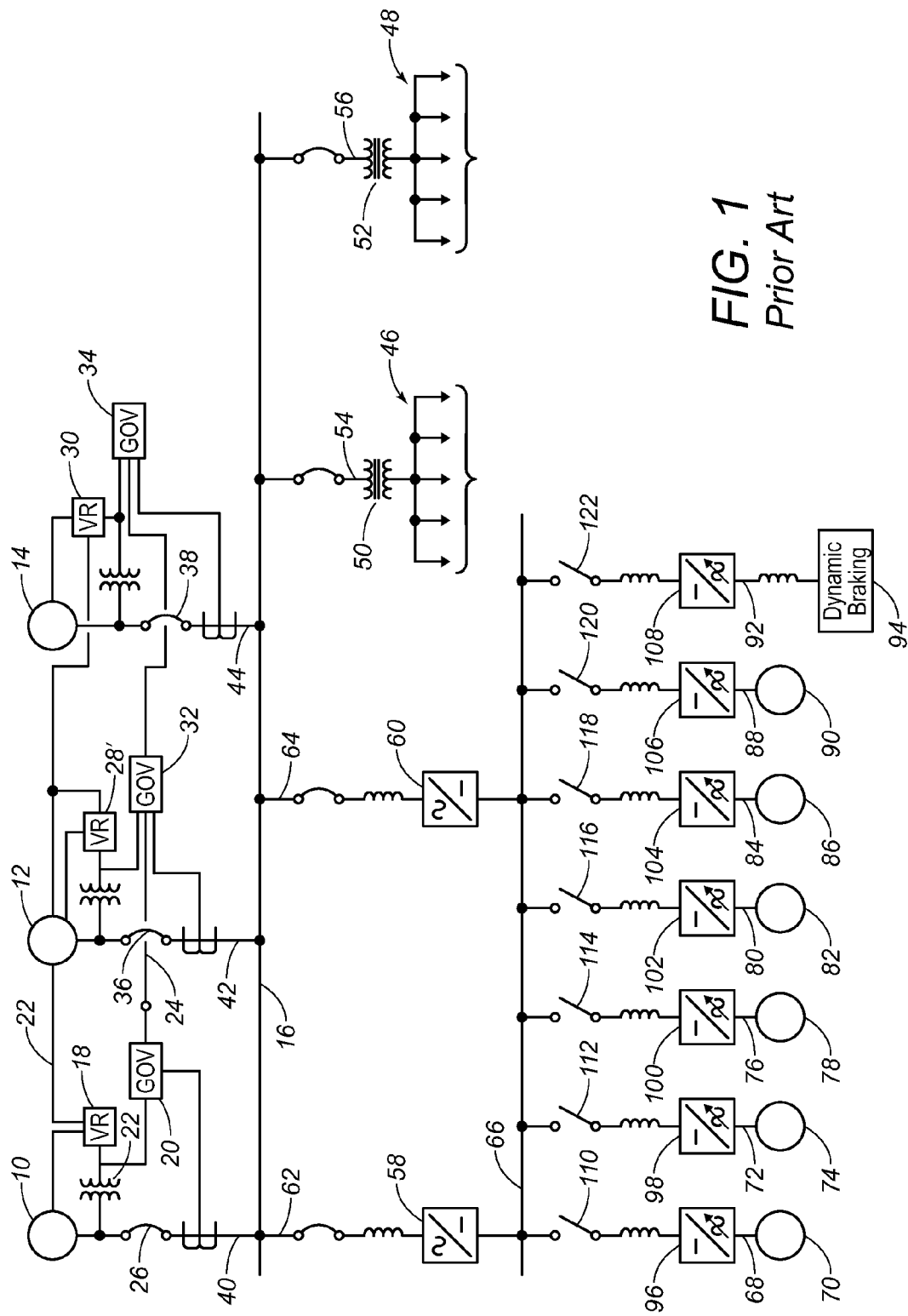
FIG. 1 is a schematic illustration of the energy system for drilling rigs of the prior art.
Figure 2:
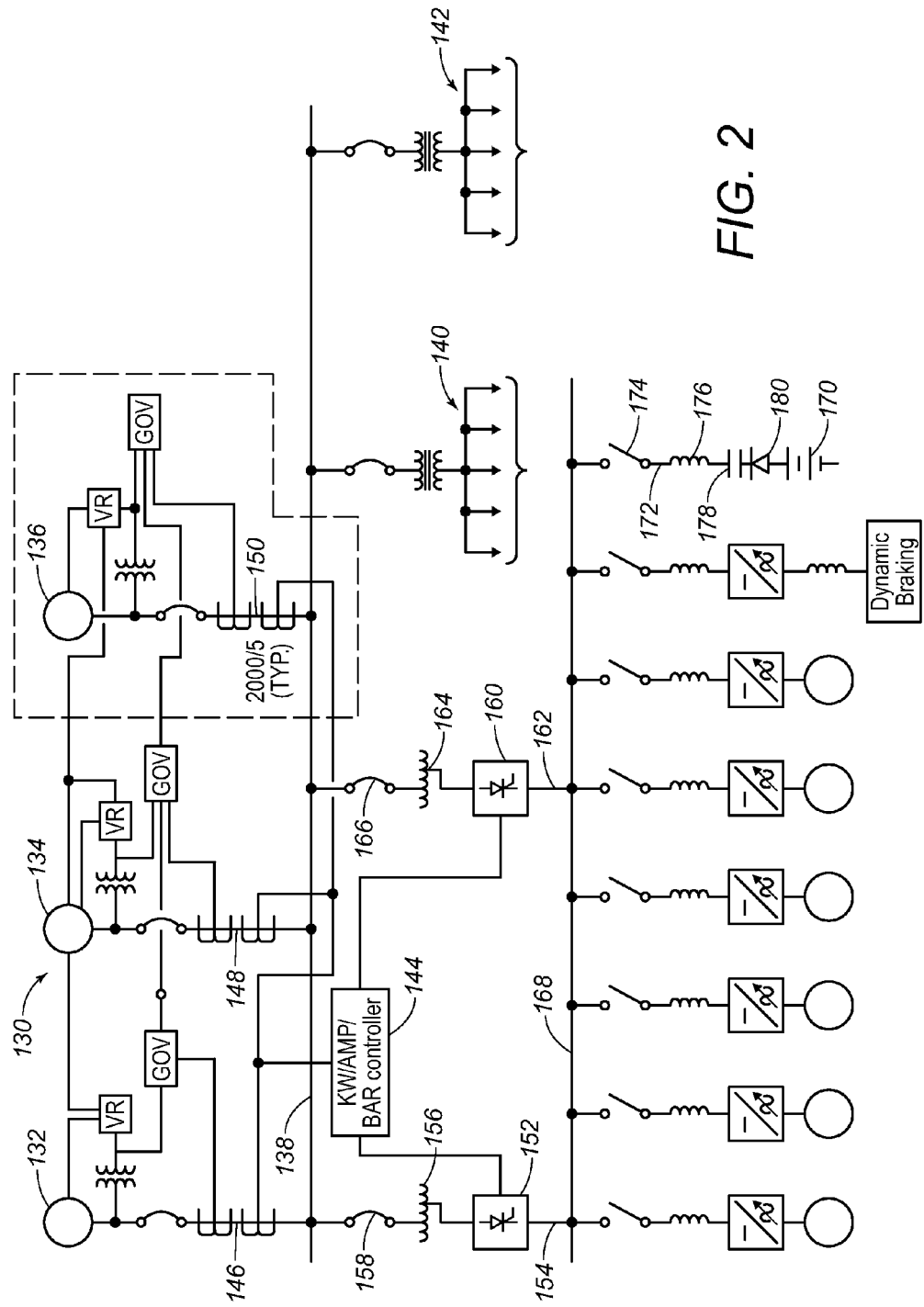
FIG. 2 is a schematic illustration of the preferred embodiment of the energy system of the present invention.

FIG. 2 shows the preferred embodiment of the energy system of the present invention. The energy system 130, as illustrated in FIG. 2, is used in association with the various energy-consuming components of a drilling rig. In FIG. 2, it can be seen that engine/generator 132, 134 and 136 are used to generate the power requirements for the system 130. The engine/generator 136 is optional based upon the power requirements of the system 130. Within the concept of the present invention, it is possible that the system 130 would only require the power output from the engine/generators 132 and 134. The various voltage regulators and governors are connected to the engine/generators 132, 134 and 136 in the manner in described previously in FIG. 1. Each of the engine/generators 132, 134 and 136 is connected to the AC bus 138. The motor control centers 140 and 142 are connected to the AC bus 138 in the manner described herein previously.

In FIG. 2, it can be seen that there is a KW/AMP/BAR controller 144 that is joined to each of the lines 146, 148 and 150 associated with the engine/generators 132, 134 and 136. A first SCR-controlled rectifier 152 is connected to line 154. An autotransformer 156 is connected to line 154. A circuit breaker 158 is formed on line 154. The KW/AMP/BAR controller 144 is connected by line to the SCR-controlled rectifier 152. This KW/AMP/BAR controller 144 is also connected to a second SCR-controlled rectifier 160. SCR-controlled rectifier 160 is connected to line 162. Line 162 also includes another autotransformer 164 and a circuit breaker 166. Lines 154 and 162 are connected to the common DC bus 168.

The various energy-consuming components of the drilling rig of the system 130 are connected to the common DC bus 168 in the manner described in association with FIG. 1.

Importantly, the DC bus 168 is connected to the energy storage system 170 by line 172. Line 172 has a DC disconnect switch 174 thereon. A reactor 174 is also on line 172. A DC contactor 178 is on line 172. The blocking diode 180 serves to connect the energy storage 170 with line 172. The energy storage 170 can be in the nature of lead-acid batteries, ultra-capacitors, lithium titanate batteries or paralleled-series connections of batteries and capacitors.

The unique feature of the energy system 130, as shown in FIG. 2, is to "diode or" the energy storage system 170 to the common DC bus 168. There will always be a nominal voltage from this DC storage 170 slightly lower than the rectified AC-to-DC conversion from the SCR phase-controlled bridge rectifiers 152 and 160.

When utilizing the SCR controller with the standard engine/generator voltages, the autotransformers 156 and 164 are implemented for a twelve-pulse convertor which is approximately 10% higher, once rectified at full conduction angle in phase-controlling SCR controllers 152 and 160 and by using current feedback from the main engine/generators 132, 134 and 136 so as to conduct back this AC-to-DC voltage once a threshold of current (full load current or selectable current limit) is reached. Once this DC source voltage from the engine/generators 132, 134 and 136 is achieved, then the energy storage 170 will supply the necessary excess power that the engine/generators 132, 134 and 136 cannot supply due to power limitations.

The system 130 is practical, low cost, inherently stable and reliable. The redundancy of having the DC stored energy directly tied to the common DC link with passive devices is important to safety issues with well control and circulation of drilling mud and drawworks control. As such, power can continued to be supplied even in the event of loss of AC power from any or all of the engine/generators 132, 134 and 136.

Figure 3:
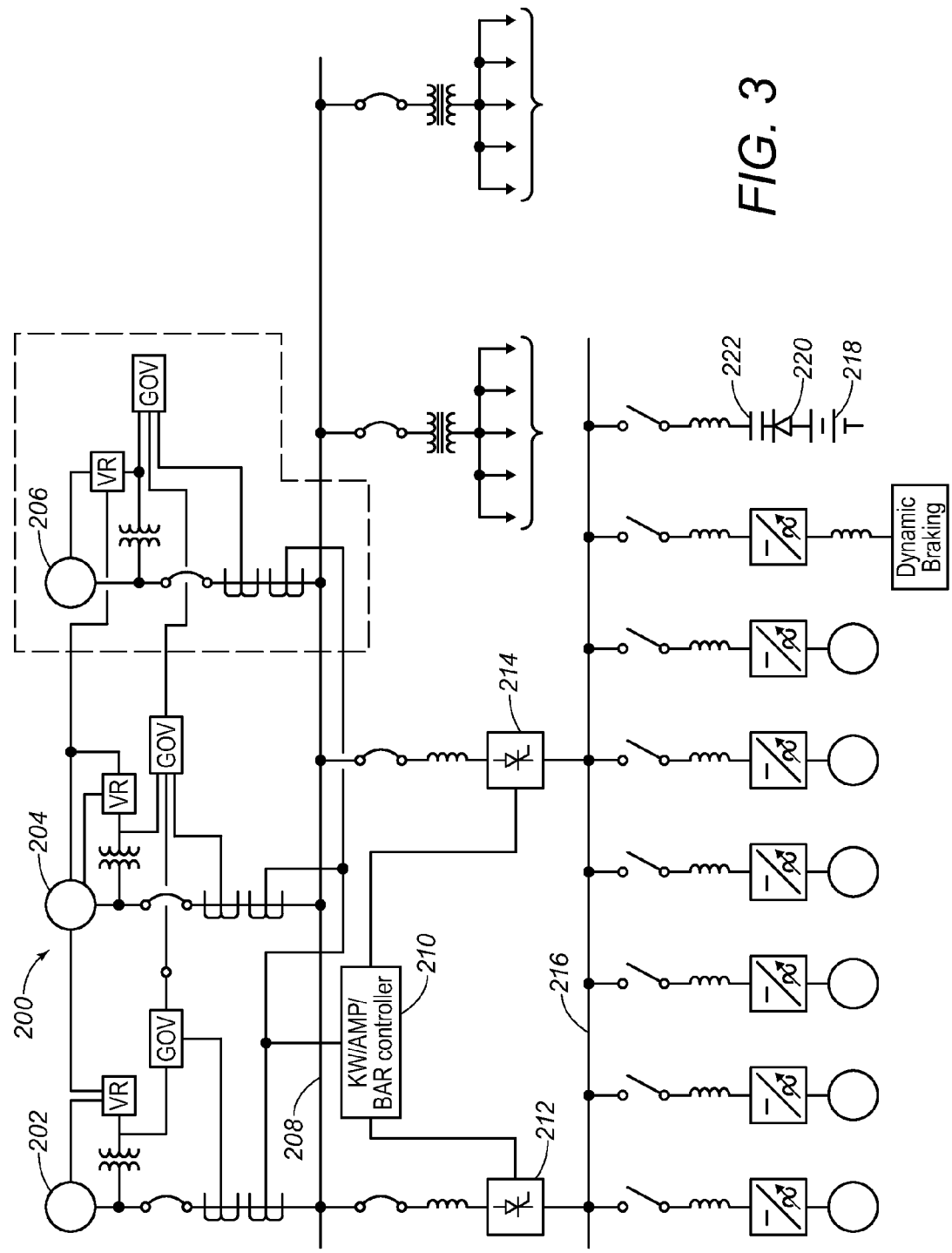
FIG. 3 is a schematic illustration of a first alternative embodiment of the energy system of the present invention.

FIG. 3 shows an alternative embodiment of the present invention. As with previous embodiments, the system 200 has engine/generators 202, 204 and 206. Each of the engine/generators 202, 204 and 206 are connected to the common DC bus 208. A KW/AMP/VAR controller 210 is connected to the SCR bridge rectifiers 212 and 214. The bridge rectifiers 212 and 214 are connected to the common DC bus 216. The various motors and energy-consuming components of the drilling rig are connected (in the manner described in FIG. 1) to the common DC bus 216. The energy storage 218 is connected by way of a blocking diode 220 and a DC contactor 222 to the DC bus 216.

As can be seen in the embodiment of FIG. 3, the AC synchronous engine/generators 202, 204 and 206 can be over-excited by 10% and still be within the design and Nema ratings for such equipment. It is not necessary to modify any existing equipment or hardware. The distribution transformers can be tapped for a nominal voltage of 480 VAC secondary voltage once the 600 VAC voltage is raised to the +10% value. In this configuration, it can be seen that there are no autotransformers (such as the autotransformers 156 and 164 of FIG. 2). Only the SCR controllers 212 and 214 as used as six pulse converters. These converters are phase-controlled and line-commutated SCR controllers. The nominal voltage would be phase-controlled and set for a nominal DC level approximately 10% above the nominal voltage of the energy storage 218.

Figure 4:
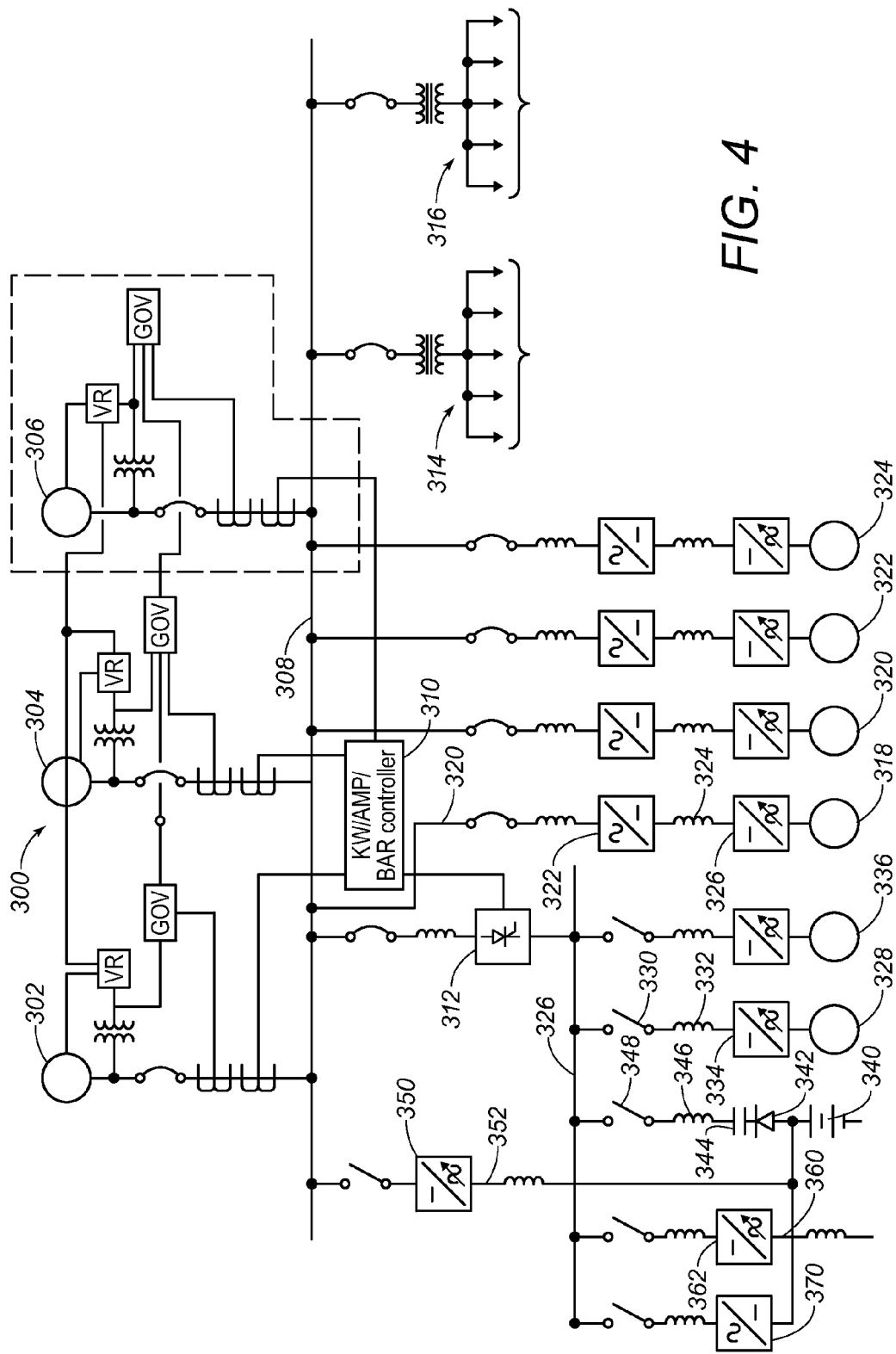
FIG. 4 is a second alternative embodiment of the energy system of the present invention.

FIG. 4 shows another alternative embodiment of the present invention. The system 300 of the FIG. 4 has engine/generators 302, 304 and 306. Engine/generator 306 can be optional depending on the power requirements of the system. Each of the engine/generators 302, 304 and 306 are connected to a common AC bus 308. The KW/AMP/VAR controller 310 is interactive with the lines from the engine/generators 302, 304 and 306. The KW/AMP/VAR controller 310 is also connected to the SCR bridge rectifier 312. The motor control centers 314 and 316 are connected to the common AC bus 308.

As can be seen in FIG. 4, those components of the drilling system 300 that do not have very intermittent loads are connected directly to the common AC bus 308. It can be seen that the first mud pump 318 is connected by a line 320 to the common AC bus 309. There is an AC to DC rectifier 322, a reactor 324 and a DC-to-AC converter 326 connected in series along line 320. A similar configuration is also applied to the second mud pump 320, the top drive 322 and the rotary table 324.

The SCR-controlled rectifier 312 is connected to a common DC bus 326. The intermittent energy-consuming components 300 will be connected to this common DC bus 326. As can be seen, the first drawworks 328 is connected to the common DC bus 326 by a DC disconnect switch 330, a reactor 332 and an DC-to-AC converter 334 connected in series. Similarly, the second drawworks 336 is also connected by similar components to the common DC bus 326.

Energy storage 340 is also connected to the common DC bus 326. As with the previous embodiments, the energy storage 340 has a blocking diode 342, a DC contactor 344, a reactor 346 and a DC disconnect switch 348 arranged in series to the common DC bus 326. Importantly, in this embodiment, there is a charger 350 that is connected on line 352 to the common AC bus 308. Charger 350 is connected to the back-side of the blocking diode 342 so as to pass energy to the energy storage 340 so as to create a rechargeable battery. An optional charger 370 can be connected to the common DC bus 326 and to the energy storage 340. A DC-to-AC converter 362 will serve to convert the DC power from the bus 326 into AC power for the recharging of the energy storage 340.

The present invention provides a significant improvement over the prior art. The present invention is able to phase control the DC bus voltage level to a higher value to the energy storage system's nominal system voltage. The present invention also phase-controls the AC-to-DC rectified conversion via current limit, VAR limit and/or power limit from the synchronous engine/generator threshold levels. The "diode or" arrangement of the DC storage system to the common DC bus is achieved by passive control devices that are directly connected. The control topology of the present invention offers inherent control stability. The present invention always maintains the DC operating level within a stable control tolerance of the DC-to-AC inverter that is connected to the common DC bus system. The varying of the DC bus level by way of the power/current limit threshold function is able to maintain peak shaving from the energy storage system. The present invention utilizes the regenerative energy to store the captured braking energy for reuse in the hoisting function. The same control and system topology for non-common DC bus drilling applications allow connection of the "diode or" energy storage system to the DC bus which supplies the drawworks' motor controller inverters. The energy storage can be in the form of a battery, a capacitor, or in combination of paralleled-series connection of either batteries or capacitors.

The foregoing disclosure and description of the invention is illustrative and explanatory thereof. Various changes in the details of the described system can be made within the scope of the appended claims without departing from the true spirit of the invention. The present invention should only be limited by the following claims and their legal equivalents.

The invention claimed is:

1. An energy storage system comprising:
   a source of power;
   an AC bus connected to said source of power;
   a DC bus having a DC source voltage;
   a load connected to said DC bus;
   a rectifying means connected to said AC bus and to said DC bus, said rectifying means for converting AC power from said source of power to DC power to said load;
   an energy storing means connected to said DC bus, said energy storage means for supplying energy to said load;
   an energy supplying means connected between said energy storing means and said DC bus, said energy supplying means for supplying energy to said load when a DC voltage to said load is less than the DC source voltage;
   a charging means connected to said AC bus, said charging means for supplying power to said energy storing means; and
   a blocking diode connected between said energy storing means and said DC bus, said charging means connected between said blocking diode and said energy storing means.

2. The energy storage system of claim 1, said energy storing means selected from the group of batteries, capacitors, and paralleled-series of batteries and capacitors.

3. The energy storage system of claim 1, said energy storing means having a nominal voltage slightly lower than an voltage of said rectifying means.

4. The energy storage system of claim 1, further comprising:

a charging means connected to said DC bus and to said energy storing means, said charging means for supplying power to said energy storing means.

5. An energy storage system for a drilling rig comprising:

an engine/generator suitable for producing AC power;

a rectifying means electrically interconnected to said engine/generator for convening, the AC power to DC power;

a DC bus electrically connected to said rectifying means, said DC bus having a DC source voltage;

a load connected to said DC bus;

an energy storing means connected to said DC bus, said energy storing means for supplying power to said load when a DC voltage to said load at, said DC bus is less than the DC source voltage:, and a diode connected between said energy storing means and said DC bus, said diode suitable for allowing power to pass from said energy storing means to said load when said DC voltage is less than said DC source voltage.

6. The energy storage system of claim 5, said energy storing means selected from the group consisting of batteries, capacitors, and paralleled-series of batteries and capacitors.

7. The energy storage system of claim 5, further comprising:

an AC bus connected to said engine/generator and to said rectifying means.

8. The energy storage system of claim 7, further comprising:

a charging means connected to said AC bus, said charging means for supplying power to said energy storing means.

\* \* \* \* \*